United States Patent [19]

Ichihara et al.

[11] 4,093,437
[45] June 6, 1978

[54] AIR FILTER MATERIAL

[75] Inventors: Hiroo Ichihara, Nagoya; Yuzuru Ohta, Kasugai, both of Japan

[73] Assignee: Nippondenso Co., Ltd., Japan

[21] Appl. No.: 717,667

[22] Filed: Aug. 25, 1976

[30] Foreign Application Priority Data

Aug. 26, 1975 Japan .................... 50-103744

[51] Int. Cl.$^2$ ............................. B01D 50/00
[52] U.S. Cl. ........................ 55/487; 55/524; 55/528; 210/508
[58] Field of Search ................. 55/485–487, 55/528, 524; 210/488–491, 508, 509

[56] References Cited

U.S. PATENT DOCUMENTS

| 853,981 | 5/1907 | Kneuper | 210/491 |
| 2,933,154 | 4/1960 | Lauterbach | 55/486 |
| 3,400,520 | 9/1968 | Sakurai | 55/487 |
| 3,871,850 | 3/1975 | Lenane | 55/486 |
| 3,877,909 | 4/1975 | Hansen | 55/528 |

FOREIGN PATENT DOCUMENTS 1,018,379  1/1966  United Kingdom ............ 55/486

Primary Examiner—Bernard Nozick
Attorney, Agent, or Firm—Cushman, Darby & Cushman

[57] ABSTRACT

An air filter material having the construction of (1) an upper fibrous layer to be disposed at upper-stream position of influent air, containing 50 to 70% by weight of small diameter polyester fiber and 50 to 30% by weight of larger diameter polyester fiber, the basis weight of the layer being 25 to 45 g/m$^2$; (2) an intermediate fibrous layer partially jointed to the upper layer by local intertwinement of fibers, containing 60 to 80% by weight of small diameter polyester fiber and 20 to 40% by weight of larger diameter polyester fiber, the basis weight of the intermediate layer being 40 to 60 g/m$^2$; (3) a lower fibrous layer to be disposed at downstream position of the influent air, which is partially jointed to the intermediate layer by local intertwinement of fibers and which contains 60 to 80% by weight of small diameter rayon fiber and 40 to 20% by weight of larger diameter rayon fiber, the basis weight of the lower fibrous layer being 80 to 100 g/m$^2$; and (4) a resin applied to the unified mass of the three fibrous layers; has improved dust holding capacity and air filter efficiency and a high in mechanical strength.

6 Claims, 4 Drawing Figures

AIR FILTER MATERIAL

BACKGROUND OF THE INVENTION

This invention relates to an air filter material for use in conjunction with, for example, automobile engines and air-conditioning systems.

Conventionally known filter materials which have been generally used in the above-noted fields are (1) filter papers made of rayon, cotton, or wood pulp as raw materials, (2) filter papers of the group (1) impregnated with oils, (3) simple laminates of two fibrous layers of different bulk densities bonded to each other with an adhesive, each layer consisting of synthetic fibers, as disclosed in U.S. Pat. No. 3,400,520 (hereinafter this type of filter materials is referred to as "conventional density-gradient type nonwoven synthetic fiber fabric"), (4) synthetic resin foams, and (5) the synthetic resinfoams of the group (4) impregnated with oils.

However, being a surface filtration type, the materials of the group (1) must have a large filter area and, hence, have a disadvantage of requiring increased man-hours in making a filter element for use in automobiles; because of the oil-impregnated type, the materials of the group (2) must be made of a filter paper having a large pore size and, in addition, a large porosity in order to prevent the increase in restriction to airflow caused by the impregnant oil, resulting in decreased air-filter efficiency. The filter material of the group (3), which is a laminate of two nonwoven fabric layers of different bulk densitites made of customary synthetic fibers (polyester fiber, polyvinyl alcohol fiber, and rayon), is still insufficient in dust holding capacity. The materials (4) and (5) are also unsatisfactory because of the widely dispersed pore size and porosity and, in addition, inferior air filter efficiency.

SUMMARY OF THE INVENTION

An object of this invention is to provide an air filter material which is improved in dust holding capacity and in air filter efficiency, high in mechanical strength, and capable of reducing the filtration area of an air filter element. This object may be achieved, as described hereunder, by assembling layer by layer in a laminate form multiple number of fibrous sheets of different densities consisting of fibers of selected types and of selected fineness which are blended in selected ratios, then establishing local intertwinement among fibers of each layer in the direction perpendicular to the layers to form an integral multilayer structure, and applying to the resulting structure a specified amount of a thermosetting resin to form the filter material.

PREFERRED DESCRIPTION OF THE INVENTION

An example of a preferred embodiment of this invention is illustrated below with reference to the accompanying drawings.

Figure 1:
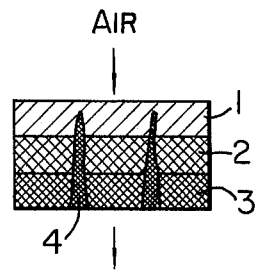
FIG. 1 is a vertical sectional view illustrating the structure of the present air filter material.
Figure 2A:
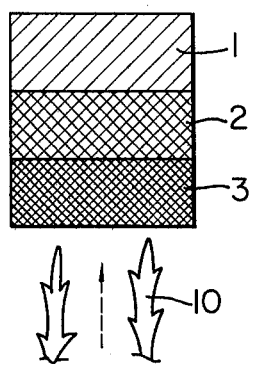
FIGS. 2A and 2B are vertical sectional views of a portion of the present air filter material in a step embodying the present invention, FIG. 2A illustrating the laminated material before being needle-punched and FIG. 2B the same material after having been needle-punched.
Figure 2B:
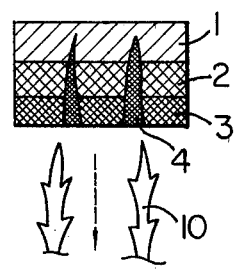

In FIG. 1, FIG. 2A, and FIG. 2B, 1 is an upper fibrous layer which is disposed at upstream position of influent air. An intermediate fibrous layer 2 is arranged between the upper layer 1 and a lower fibrous layer 3 which is disposed at downstream position of the influent air, thus forming a multilayer structure. The upper layer 1 and the intermediate layer 2 consist of polyester fibers alone, while the lower layer 3 consists of rayon fibers alone. The three layers 1, 2, and 3 are made into an integral structure by needle-punching in such a manner that the needles 10 (#–40) are allowed to penetrate into the laminated layers from the lower layer side and then withdrawn, leaving behind the portion 4 where intertwinement of fibers in the layers 1, 2, and 3 has taken place. In this way a filter material in sheet form having a thickness of 2.9 to 3.5 mm may be obtained. The number of needle punching is preferably 35 to 45 /m$^2$.

The above sheet of integral structure formed by needle punching is sprayed on both of the upper side 1 and the lower side 3 with a solution of a thermosetting resin such as, for example, a water-soluble acrylic resin to deposit the acrylic resin in the upper layer 1, intermediate layer 2, and lower layer 3, forming bonds not only among the fibers, but also between the fibrous layers. The fineness and blending ratio of fibers in each layer are selected in the following way.

In order to impart to the filter material a dust holding capacity superior to that of a conventional density-gradient type nonwoven synthetic fiber fabric, it is preferable to use polyester fiber which causes generally smaller pressure loss when loaded with dust. According to the present invention, the upper layer 1 consists of a blend of fibers comprising 50 to 70% (by weight; the same shall apply hereinafter) of polyester fiber of small diameter, e.g. 2 denier, and 50 to 30% of polyester fiber of larger diameter, e.g. 6 denier, and the intermediate layer 2 consists of 60 to 80% of polyester fiber of small diameter and 40 to 20% of larger diameter, e.g. 2 to 2.5 denier. In the present invention, in order to impart to the filter material an air filter efficiency superior to that of a conventional density-gradient type nonwoven synthetic fiber fabric and to catch fine particles passed through the upper layer 1 and the intermediate layer 2, the lower layer 3 consists of 60 to 80% of rayon fiber of small diameter, e.g. 1.5 denier, and 20 to 40% of rayon fiber of larger diameter, e.g. 2 denier. The amount of fibers per unit area (basis weight) is 25 to 45 g/m$^2$ in the upper layer 1, 40 to 60 g/m$^2$ in the intermediate layer 2, and 80 and 100 g/m$^2$ in the lower layer 3.

By arranging the above three layers so as to set up a density gradient through the assembly after having been made into an integral structure, there is obtained an air filter material having performance characteristics, such as air filter efficiency and dust holding capacity, which are at sufficiently high levels.

In the upper layer 1, if only the coarser polyester fibers are used, the decreased dust holding capacity will cause a dust overloading on the part of the intermediate layer 2 and the lower layer 3, whereas if only the fine polyester fibers are used, although the dust holding capacity is increased, clogging of pores with dust will be resulted in a short period of operation. Therefore, in order that the upper layer may have an optimum dust holding capacity, which lies approximately midway between the dust holding capacity of fine polyester fibers and that of the coarser ones, so that neither dust overloading on the part of intermediate layer 2 and lower layer 3 nor rapid clogging of pores with dust may take place, it is necessary that, as mentioned above, the fine fiber content is 50 to 70% and the coarser fiber content 50 to 30%. If the fine fiber content is below 50% and the coarser fiber content exceeds 50%, the dust holding capacity is decreased, resulting in dust overloading on the part of intermediate layer 2 and lower layer 3, whereas if the fine fiber content exceeds 70% and the coarser fiber content is below 30%, although the dust capacity is increased, clogging of pores with dust will be resulted in a short while.

In the intermediate layer 2, similar reasonings to those mentioned above hold regarding the relation between fiber diameters of both kinds of fiber and to the blending ratio thereof.

In the lower layer 3, if only the coarser rayon fibers are used, the decreased density of the layer will cause insufficient arrest of the fine particles passed through the upper layer 1 and the intermediate layer 2, resulting in decreased air filter efficiency of the element, whereas if only the fine rayon fibers are used, the increased density will cause an increase in restriction. Therefore, in order that the lower layer may have an optimum density, which lies approximately midway between the densities of a layer of the fine rayon fibers and a layer of the coarser rayon fibers, and yet have a sufficient air filter efficiency, it is necessary that, as mentioned before, the fine rayon fiber content is 60 to 80% and the coarser rayon fiber content is 40 to 20%. If the fine rayon fiber content is below 60% and the coarser rayon fiber content is above 40%, the density of the layer is decreased and the air filter efficiency becomes insufficient, whereas if the fine rayon fiber content is above 80% and the coarser rayon fiber content is below 20%, the density becomes so high that increased restriction will be resulted.

The range of suitable basis weight of each fibrous layer is as mentioned above. If the basis weight is below 25 g/m$^2$ in the upper layer 1, below 40 g/m$^2$ in the intermediate layer 2, and below 80 g/m$^2$ in the lower layer 3, the filtration life will be shortened, whereas if the basis weight is above 45 g/m$^2$ in the upper layer 1, above 60 g/m$^2$ in the intermediate layer 2, and above 100 g/m$^2$ in the lower layer 3, the cost of air filter will become undesirably high.

A suitable application rate of the thermosetting resin is in the range of 25 to 35% by weight based on total weight of the air filter material for imparting improved mechanical strengths to the air filter material at reasonable cost and without appreciably increasing the restriction.

The present air filter material comprises a synthetic fiber assembly in the form of reticulum as well as multiple layers and the density increases from the upper layer 1 toward the lower layer 3, forming a density-gradient type air filter material. Coarse dust particles are removed by the upper layer and finer particles by the intermediate and lower layers. By the adoption of needle-punching technique, the fibers in the upper layer 1, intermediate layer 2, and lower layer 3 locally intertwine one another in the vertical direction. The localities 4 where intertwinement took place have higher densities and act, jointly with the applied thermosetting resin, to increase rigidity of the filter material. Accordingly, contrary to the conventional density-gradient type nonwoven synthetic fiber fabric, each layer of the present filter material undergoes minor deformation caused by the increased pressure loss due to dust loading. Thus, as compared with a conventional density-gradient type nonwoven synthetic fiber fabric, the present air filter material undergoes minor change in the volume which entraps the dust and, hence, holds greater amounts of dust at a comparable pressure loss due to dust loading.

Figure 3:
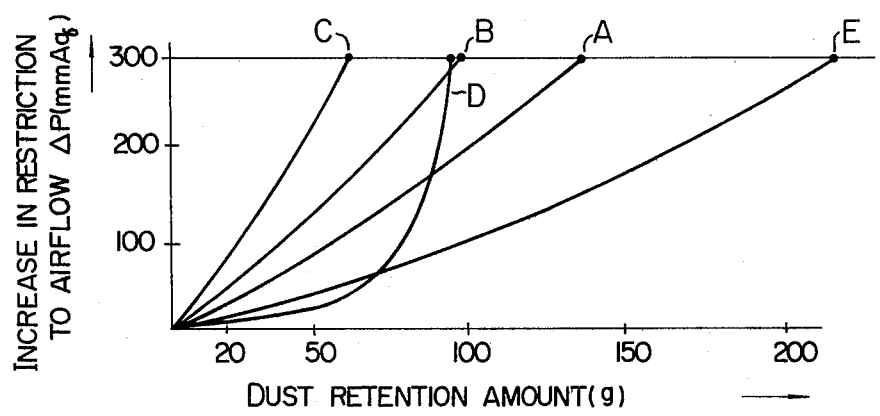
FIG. 3 is diagrammatic representation of the results of comparative tests conducted on automobile air filter elements manufactured by use of the present filter material and other conventional filter materials to determine for each element the relationship between the increase in restriction to airflow and the amount of dust retained.

The results of comparative tests conducted on the present filter material and conventional ones used in air filter elements for automobile are illustrated below with reference to FIG. 3. FIG. 3 is diagrammatic representation of the increase in restriction as the function of dust retention, plotted from the results of tests conducted according to the method specified in JIS D 1612 (Test code of air cleaners for automobiles) under the following conditions: displacement of the test engine, 1,200 cc; maximum airflow (rated airflow), 3 m$^3$/min.; dust concentration, 1 g/m$^3$ (JIS Z 8901, powder #8); filter area, 2000 m$^2$. In FIG. 3, the ordinate represents the increase, ΔP, in restriction, the abscissa represents the weight, in g, of dust held by the filter element, A stands for an element from the present filter material, B for an element from a conventional density-gradient type nonwoven synthetic fiber fabric, C for an element from a conventional filter paper, D for an element from a filter paper impregnated with an oil, and E for an element from a synthetic resin foam (e.g. "Bridgestone Scotch Filter 36").

The initial air filter efficiencies, as expressed in the efficiency when 20 g of dust have been fed, were (A) (the element from the present filter material) 97.3%, (B) 96.0%, (C) 98.5%, (D) 98.0%, (E) 65%. The full-life filter efficiencies, as expressed in the efficiency when the increase in restriction reached 300 mm Aq, were (A) (the element from the present filter material) 99.4%, (B) 99.2%, (C) 99.8%, (D) 95%, (E) 81%. The dust holding capacities, as expressed in the quantity of dust held by the element when the increase in restriction reached 300 mm Aq, were (A) 130 g, (B) 90 g, (C) 60 g, (D) 85 g, (E) 200 g. Thus, it is seen that the element A from the present filter material is superior in air filter efficiency and dust holding capacity as collectively compared with other elements B, C, D, and E.

In the above example, the fiber used in the lower layer 3 was rayon having a high moisture regain, in other words, moisture-containing rayon. When the end plates attached to both sides of the air filter element for automobile are made of a foamed resin or a metal, the moisture contained in the rayon in the present air filter material presents no problem. However, if a polyvinyl chloride resin material is used as the end plate, the vapor from the moisture-containing rayon presents difficulties by forming pinholes in the end plate during heat treatment required for its fabrication. In such a case where the moisture contained in rayon presents problems, it is necessary to decrease the moisture content of the filter material. As a result of investigations, the present inventors have solved the problem of moisture by substituting the rayon fiber with a mixture comprising 70% of a blend of fine (e.g. about 1.5 denier) rayon fiber and coarser (e.g. about 2 denier) rayon fiber and 30% of fine (e.g. about 1.4 denier) polyvinyl alcohol fiber. A polyvinyl alcohol fiber content of the lower layer below 30% is insufficient to reduce the moisture content of the air filter material containing rayon, whereas if the polyvinyl alcohol fiber content of the lower layer exceeds 30%, the air filter efficiency is decreased owing to the reduced contribution from rayon. It is desirable in view of the air filter efficiency that in the lower layer, the rayon fiber blend occupies 70% of the lower layer, in more detail 30 to 50% thereof are fine rayon fiber and 40 to 20% thereof are coarser rayon fiber. The fineness of the polyvinyl alcohol fiber was found substantially of no effect on the air filter efficiency. A filter element prepared by use of a filter material containing polyvinyl alcohol fiber in the lower layer 3 was found comparable in performance characteristics to that prepared from a filter material containing no polyvinyl alcohol fiber, as evaluated by the restriction increase test similar to the test mentioned above.

As described in the foregoing, according to the present invention, there is provided a density-gradient type air filter material having favorable filtration performance and superior in air filter efficiency and dust capacity to the conventional density-gradient type nonwoven synthetic fiber fabric for air filtration.

Since the fibers in the upper, intermediate, and lower intertwine interwine one another to unite these layers into an integral structure, no delamination would occur even when the present filter material is folded into the form of chrysantheumum blossom.

Further, since the layers are united together by intertwinement of fibers and, in addition, rigidity is imparted throughout the layers by application of a thermosetting resin, deformation of the present filter material remains small even when the pressure loss is increased due to accumulation of dust. This leads to increased dust capacity of the present filter material. By taking advantage of this property, it is possible to make a filter element lighter in weight and smaller in size by reducing the filter area.

According to this invention, difficulties arising from the moisture contained in the rayon fiber may be overcome by using a lower layer composed of 30 to 50% of fine rayon fiber, 40 to 20% of coarser rayon fiber, and polyvinyl alcohol fiber to make up the balance to reduce the moisture content of the filter material originated from the rayon fiber.

What is claimed is:

1. An air filter material comprising:
   (1) an upper fibrous layer to be disposed at upperstream position of influent air, containing 50 to 70% by weight of polyester fiber having a diameter of about 2 denier and 50 to 30% by weight of polyester fiber having a diameter of about 6 denier, the basis weight of said layer being 25 to 45 g/m$^2$;
   (2) an intermediate fibrous layer containing 60 to 80% by weight of polyester fiber having a diameter of about 1.5 denier and 40 to 20% by weight of polyester fiber having a diameter of 2 to 2.5 denier, the basis weight of said intermediate layer being 40 to 60 g/m$^2$;
   (3) a lower fibrous layer to be disposed at downstream position of the influent air, containing 60 to 80% by weight of rayon fiber having a diameter of about 1.5 denier and 40 to 20% by weight of rayon fiber having a diameter of about 2 denier, the basis weight of said lower fibrous layer being 80 to 100 g/m$^2$;
   (4) a resin applied to the unified mass of the said three fibrous layers to provide a fibrous layer lamination; and,
   (5) a plurality of columns of intertwinement extending from one side of the fibrous layer lamination to the other to increase rigidity.

2. An air filter material according to claim 1, wherein the amount of the resin is 25 to 30% by weight based on total weight of the three fibrous layers.

3. An air filter material according to claim 1, wherein the resin is an acrylic resin.

4. An air filter material comprising:
   (1) an upper fibrous layer to be disposed at upperstream position of influent air, containing 50 to 70% by weight of polyester fiber having a diameter of about 2 denier and 50 to 30% by weight of polyester fiber having a diameter of about 6 denier, the basis weight of said layer being 25 to 45 g/m$^2$;
   (2) an intermediate fibrous layer containing 60 to 80% by weight of polyester fiber having a diameter of about 1.5 denier and 40 to 20% by weight of polyester fiber having a diameter of 2 to 2.5 denier, the basis weight of said intermediate layer being 40 to 60 g/m$^2$;
   (3) a lower fibrous layer to be disposed at downstream position of the influent air, containing 30 to 50% by weight of rayon fiber having a diameter of about 1.5 denier, 40 to 20% by weight of rayon fiber having a diameter of about 2 denier, and polyvinyl alcohol fiber making up the balance, the basis weight of said lower fibrous layer being 80 to 100 g/m$^2$;
   (4) a resin applied to the unified mass of the said three fibrous layers to provide a fibrous layer lamination; and,
   (5) a plurality of columns of intertwinement extending from one side of the fibrous layer lamination to the other to increase rigidity.

5. An air filter material according to claim 4, wherein the amount of the resin is 25 to 30% by weight based on total weight of the three fibrous layers.

6. An air filter material according to claim 4, wherein the resin is an acrylic resin.

* * * * *

UNITED STATES PATENT AND TRADEMARK OFFICE
CERTIFICATE OF CORRECTION

PATENT NO. : 4,093,437
DATED : June 6, 1978
INVENTOR(S) : Hiroo ICHIHARA and Yuzuru OHTA It is certified that error appears in the above-identified patent and that said Letters Patent are hereby corrected as shown below:

Cover sheet, Item 73 after "LTD." add "Kureha, LTD."

Signed and Sealed this

Twentieth Day of March 1979

[SEAL]

Attest:

RUTH C. MASON
Attesting Officer

DONALD W. BANNER
Commissioner of Patents and Trademarks